US006663693B2

(12) United States Patent
Fenik

(10) Patent No.: US 6,663,693 B2
(45) Date of Patent: Dec. 16, 2003

(54) DUCT CLEANING FOR POWDER SPRAY SYSTEM

(75) Inventor: Larry R. Fenik, Avon Lake, OH (US)

(73) Assignee: Nordson Corporation, Westlake, OH (US)

( * ) Notice: Subject to any disclaimer, the term of this patent is extended or adjusted under 35 U.S.C. 154(b) by 0 days.

(21) Appl. No.: 10/060,443

(22) Filed: Jan. 30, 2002

(65) Prior Publication Data

US 2003/0066422 A1 Apr. 10, 2003

Related U.S. Application Data

(60) Provisional application No. 60/327,260, filed on Oct. 5, 2001.

(51) Int. Cl.[7] ................................................ B01D 45/12

(52) U.S. Cl. .................. 95/271; 55/459.1; 55/DIG. 46; 118/326; 118/DIG. 7

(58) Field of Search ........................... 95/271; 55/385.1, 55/459.1, DIG. 46; 118/326, DIG. 7

(56) References Cited

U.S. PATENT DOCUMENTS

| | | | | |
|---|---|---|---|---|
| 4,303,417 A | * 12/1981 | Koch, II | ...................... | 95/268 |
| 5,056,460 A | * 10/1991 | Vohringer | ................... | 118/634 |
| 5,107,756 A | * 4/1992 | Diaz | ........................... | 454/53 |
| 5,205,869 A | * 4/1993 | Ahern | ........................ | 118/324 |
| 5,906,676 A | 5/1999 | Drummond | | |

* cited by examiner

*Primary Examiner*—Robert A. Hopkins
(74) *Attorney, Agent, or Firm*—Calfee, Halter & Griswold LLP

(57) ABSTRACT

Method and apparatus for cleaning a powder transfer duct uses a pressurized volume of air directed at an interior surface of the duct to dislodge powder particles adhering to the interior surfaces or that are entrapped within a volume or region of the duct interior. In one embodiment of the invention, the duct is a passageway for powder that is entrained in an air stream from a powder spray booth to a powder collection device such as, for example, a cyclone separator. Pressurized air is provided by a device that can be selectively activated to direct a blast of high pressure air into the duct interior in a direction that is generally transverse a primary air flow through the duct. The device may be realized in the form of a pulse valve that has an outlet that opens to the duct interior and directs a pulse of pressurized air at a surface or region within the duct where powder tends to accumulate, either from eddy current characteristics or from impacting the interior surface. The pulse valve may be mounted to a wall of the duct. Pressurized air is supplied to the pulse valve from an accumulator connected thereto. The pulse valve may be manually actuated or actuated by other suitable control mechanisms. In accordance with another aspect of the invention the device is activated while air is flowing through the duct, such as when the separator is operating.

19 Claims, 2 Drawing Sheets

DUCT CLEANING FOR POWDER SPRAY SYSTEM

RELATED APPLICATION

This application claims the benefit of co-pending U.S. provisional patent application serial No. 60/327,260 filed on Oct. 5, 2001 for DUCT CLEANING WITH PULSE VALVE, the entire disclosure of which is fully incorporated herein by reference.

TECHNICAL FIELD OF THE INVENTION

The invention relates generally to apparatus and methods for removing powder from powder conveying elements in a powder coating spray system. More particularly, the invention relates to methods and apparatus for removing powder that has adhered to interior surfaces or collected within interior regions of a powder transfer duct by incorporating a pulse valve or other device for applying a high volume high pressure discharge of air into the duct to dislodge the powder. The invention may conveniently be used, for example, in quick color change systems.

BACKGROUND OF THE INVENTION

Powder coating spray systems for applying a powder coating to objects typically include a partially enclosed powder spray booth and one or more powder spray guns. Various spraying technologies have been developed including electrostatic and non-electrostatic spraying. Regardless of the spraying technology used, a substantial quantity of powder overspray is usually generated because not all of the sprayed powder adheres to the target surface. This overspray powder is then recovered typically using some form of a filtering system because the overspray powder tends to be airborne or easily entrained into an air stream. A common powder recovery system utilizes one or more cyclone separators to filter powder entrained in an air flow.

Overspray powder is entrained in an air flow produced by operation of the cyclone separator, with the entrained powder being transferred from the spray booth to the cyclone separator via a powder transfer duct. Because the powder is traveling at a fairly high speed through the duct, it tends to adhere to portions of the interior surface of the duct due to impact. Eddy current effects may also cause powder to collect in corners or other interior regions of the duct. This trapped powder must be cleaned out of the duct as part of a color change operation.

Compressed air injectors are known to be used within an air flow conduit to assist in the entrainment of powder in the air flow stream, such as is shown in U.S. Pat. No. 5,906,676 issued to Drummond. The injector however directs pressurized air generally parallel to the conduit walls in order to augment air flow, not for dislodging trapped powder within the duct.

Typically, to clean the duct for color change, a cover or access door to the duct must be opened and an air wand or other manual air spray device is used to blow the powder off the interior duct surfaces. These manual cleaning operations are unsuitable for automatic or quick color change applications.

The need exists therefore to provide method and apparatus for removing powder in a duct without requiring manual spraying operations to improve speed for a quick color change powder spraying system.

SUMMARY OF THE INVENTION

In accordance with one aspect of the invention, a pressurized volume of air is directed at an interior surface of a powder transfer duct to dislodge powder particles adhering thereto. In one embodiment of the invention, the duct is a passageway for powder that is entrained in a primary air stream from a powder spray booth to a powder collection device such as, for example, a cyclone separator. In this embodiment, the pressurized air is provided by a device that can be selectively activated to direct a blast of high pressure air into the duct interior. In one specific embodiment, the device is realized in the form of a pulse valve that has an outlet that opens to the duct interior and directs a pulse of pressurized air at a surface or region within the duct where powder tends to accumulate, either from eddy current effects or from impacting the interior surfaces. The pulse valve may be mounted, for example, to a wall of the duct. Pressurized air is supplied to the pulse valve from a source such as an accumulator connected thereto. The pulse valve may be manually actuated or actuated by other suitable control mechanisms. In accordance with another aspect of the invention, the device is activated while air is flowing through the duct, such as when the cyclone separator is operating. In this circumstance, the dislodged powder becomes entrained in the primary air stream and is discharged to the cyclone separator.

In accordance with the invention, a method for cleaning a powder transfer duct is also provided. In one embodiment of the invention, a pressurized volume of air is injected into the duct at a location so as to direct the pressurized air at an interior surface or region of the duct to dislodge powder that is trapped in the duct. By blowing off the powder while the duct has a primary air stream flowing therethrough, the dislodged powder is removed from the duct.

These and other aspects and advantages of the present invention will be readily appreciated and understood from the following detailed description of the invention in view of the accompanying drawings.

DETAILED DESCRIPTION OF THE INVENTION

Figure 1:
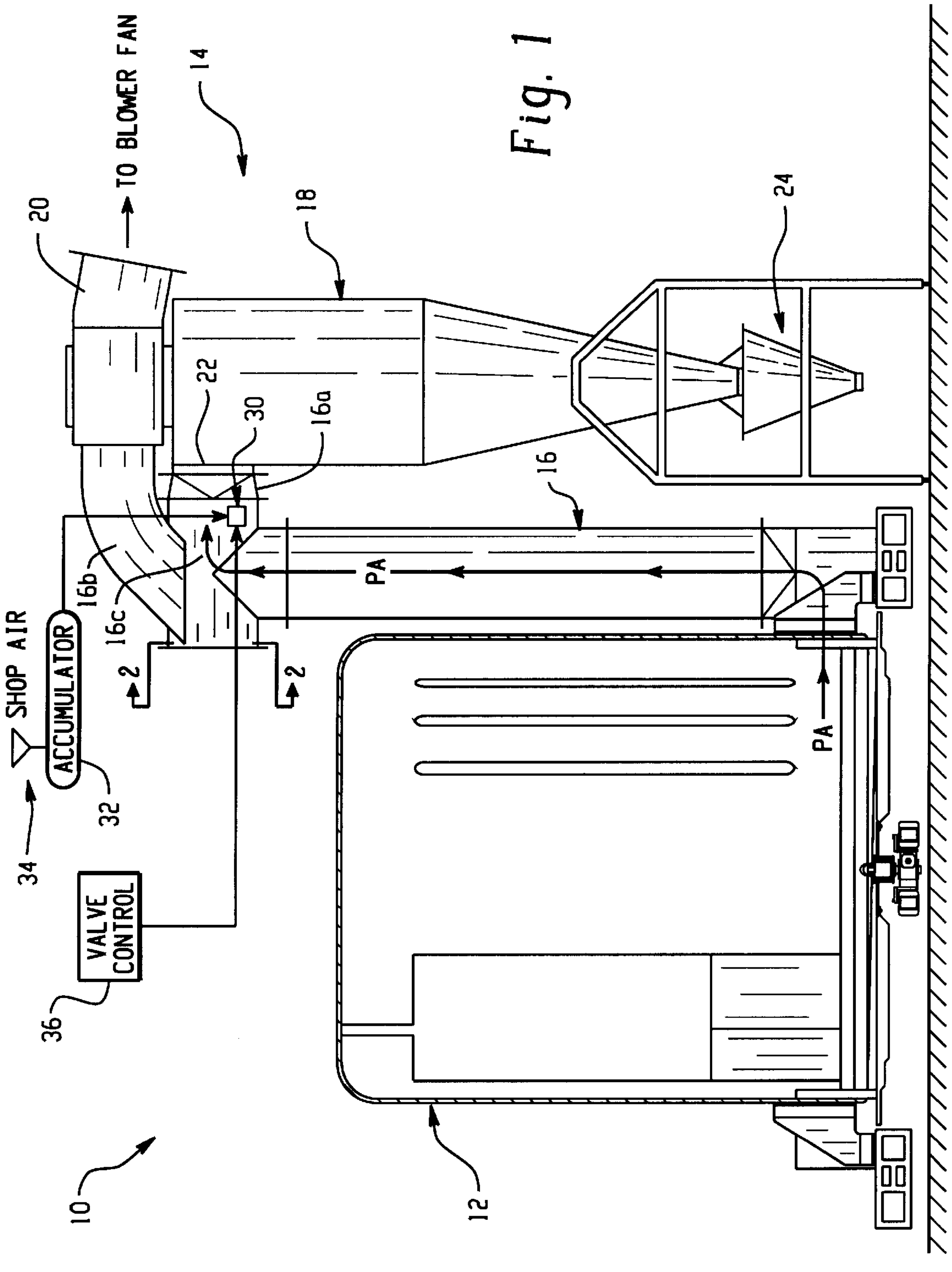
FIG. 1 illustrates in partial cross-section an elevation in schematic form of a powder application system that incorporates one embodiment of the present invention.

With reference to the drawings, the present invention is illustrated in a schematic manner incorporated into a powder coating application system generally designated with the numeral 10. Although the present invention is described herein with respect to specific elements of a typical powder coating spray system, such description is intended to be exemplary in nature and should not be construed in a limiting sense. Those of ordinary skill in the art will readily understand and appreciate that the present invention may be incorporated into many different types of powder spray systems, including but not limited to electrostatic and non-electrostatic systems. The invention may be used to reduce the time it takes to effect a powder color change, hence the invention finds particular application in quick change powder application systems, however, the invention is not limited to use in quick color change systems. For example, the invention may be incorporated into any powder transfer duct that is difficult to reach for manual powder blow off, to name just one example. The invention finds particular application in combination with an air duct that interconnects a powder spray booth and a cyclone separator, but may also be used in any powder transfer duct in which dislodging or removing trapped powder material is a concern.

Referring to the drawings then, the powder coating application system 10 typically includes a powder spray booth 12, a powder collection or recovery system 14 and a powder transfer duct 16 that interconnects the booth 12 and the collection system 14. In this example, the powder collection system 14 is realized in the form of a cyclone separator 18. An exhaust duct 20 connects the cyclone 18 to a blower (not shown) which produces a high flow volume of air from the booth 12 through the duct 16. An inlet portion 16*a* of the duct 16 is in fluid communication with an inlet opening 22 to the cyclone 18. A by-pass portion 16*b* of the duct 16 may be provided for use if required when the cyclone 18 is not being used.

The primary air stream PA produced by the cyclone 18 blower draws powder entrained air from the booth 12, such as overspray powder produced during a spraying operation. The powder laden air exits the spray booth 12 into the duct 16 and enters into the cyclone inlet 22 through the duct inlet portion 16*a*. The powder separates from the air in a known manner within the cyclone 18. The separated powder falls to a hopper 24 where it may be collected or otherwise disposed of, and the exhaust air passes out through the exhaust duct 20.

Due to the fairly high velocity of the powder particles within the primary air stream traveling through the duct 16, powder may collect in the duct 16 either due to impacting an interior surface of the duct 16 or settling in a low air flow region within the duct 16 such as can occur due to eddy current effects. These trapped powder particles must be cleaned out of the duct 16 as part of a color change operation. In accordance with one aspect of the invention, a source of pressurized air is activated that directs a volume or blast of pressurized air into the duct 16 interior to dislodge the powder that is trapped in the duct. By supplying this pressurized air concurrent with operation of the cyclone 18, the dislodged powder becomes entrained in the primary air stream and will pass into the cyclone 18.

In the illustrated embodiment, the pressurized volume of air is blast or pulse injected into the duct 16 by, for example, a quick pressure release control device such as a pulse valve 30. The control device or pulse valve 30 receives pressurized air from an accumulator 32 that is filled with shop air 34 or other source of pressurized air. The accumulator 32 stores a volume of pressurized air until such time that the valve 30 is actuated to clean the duct 16. A control valve 34 may be used to refill the accumulator 32 after the pulse valve is closed following discharge of the accumulator 32 by actuation of the pulse valve 30. Alternatively, the pulse valve 30 may be directly connected to shop air or other source of pressurized air. A suitable pulse valve, for example, is part RCA-25PX, available commercially from Goyen valve.

A control mechanism 36 is used to actuate the pulse valve 30. In one embodiment, the control mechanism is realized in the form of a manually operated valve handle. Alternatively, the pulse valve 30 may be actuated by other known mechanism such as an electric or pneumatic valve actuator for example. Multiple actuations may be used as required.

Figure 2:
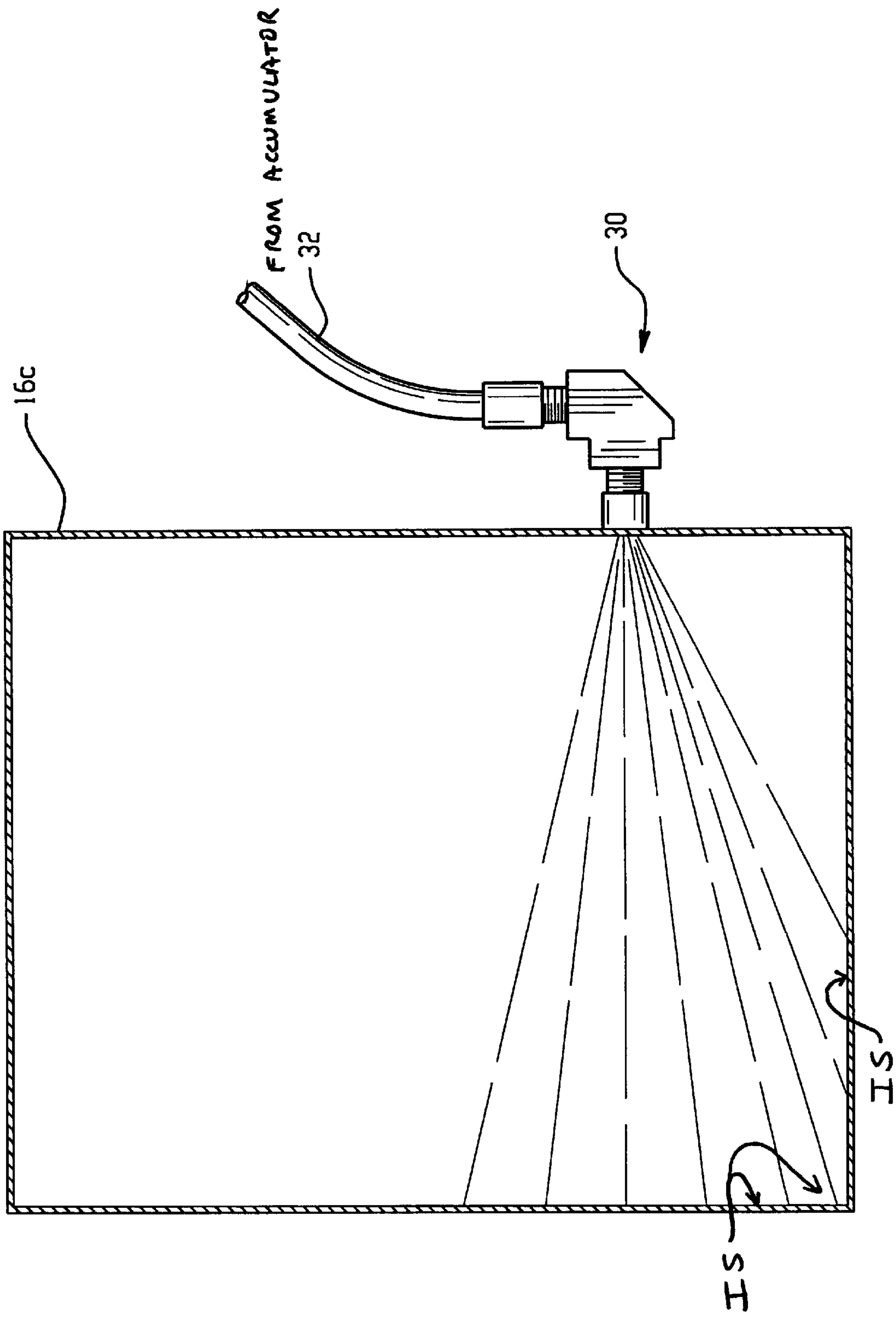
FIG. 2 is a simplified longitudinal view into a air duct taken along the line 2—2 in FIG. 1.

In accordance with another aspect of the invention, the pulse valve is mounted to a wall 16*c* of the duct 16 (see particularly FIG. 2). The location of the pulse valve 30 may be selected so as to direct the pressurized air blast at one or more of the interior surfaces IS of the duct 16 on which powder tends to accumulate or interior regions of the duct 16 where powder collects. In the exemplary embodiment, the valve 30 is mounted on a wall such that the pressurized air is released in a direction that is generally transverse the longitudinal axis of the duct 16*c* and hence transverse the direction of primary air flow through the duct 16 (in FIG. 2 the primary air flow direction would be "into" the plane of the drawing). Other directional orientations and mountings of the valve 30 may be used as required to most effectively dislodge trapped powder from surfaces and regions within the duct 16 for a specific situation. More than one pulse valve 30 may be used depending on the number of entrapment areas that are present within the duct work 16. For example, a second pulse valve (not shown) may be installed on the duct 16 or for example on the by-pass duct portion 16*b*.

When the pulse valve 30 is actuated, a preferably high volume high pressure blast of air dislodges powder trapped within the duct 16. The accumulator may be discharged by a series of high pressure shorter duration blasts or a single somewhat longer blast. Multiple discharges of the accumulator may also be used during a cleaning operation. The dislodged powder becomes entrained in the primary air stream generated by the cyclone 18 and transfers to the cyclone 18 or through the by-pass duct 16*b*. Although the pulse valve 30 is preferably actuated during operation of the cyclone 18, this may not be required in all instances as the air blast may simply dislodge the powder and relocate it to an interior volume where it becomes entrained in the overall air stream to the cyclone 18 after the cyclone 18 is started.

Although the preferred embodiment of the pressure release control device is realized in the form of a pulse valve 30, such description is intended to be exemplary in nature. Other devices and techniques may be used to provide a blast of pressurized air volume into the duct interior to dislodge powder trapped therein, although the invention excludes the use of a manually operated air wand through an access door. The invention is directed to the concept of providing the pressurized air without the need to open the duct 16 for manual cleaning. The invention thus also contemplates the method embodied in the use of the pulse valve to dislodge powder trapped within the duct 16, as well as a method of injecting a supply or blast of a pressurized volume of air into the duct 16 that is directed at an interior surface or region with the duct 16 whereat powder accumulates or adheres to the duct interior surfaces. The pressurized air is injected without opening the duct 16, and may also be performed contemporaneously with operation of the cyclone separator to immediately exhaust the dislodged powder to the cyclone 18. Multiple actuations of the pulse valve may also be used if required.

In an exemplary embodiment, a two gallon accumulator may be used to store air at a static pressure of about 90 psi (shop air pressure). A cyclone separator may produce a primary air flow in the transfer duct 16 of about 2500 ft/min. The valve may have a ¾" outlet orifice. Each air blast can be fairly short in duration, such as for example, about a half second or so, or can be longer or shorter depending on the specific cleaning needs. These values are intended to be exemplary in nature and should not be construed in a limiting sense. Values may differ for different spraying systems as required.

The invention has been described with reference to the preferred embodiment. Modifications and alterations will occur to others upon a reading and understanding of this specification. It is intended to include all such modifications and alterations insofar as they come within the scope of the appended claims or the equivalents thereof.

Having thus described the invention, I claim:

1. In a powder spraying apparatus of the type having a powder spray booth, a cyclone separator and a duct through which powder is transferred from the booth to the cyclone separator along a primary flow path, the improvement comprising:

a device for selectively directing a pressurized volume of air generally transverse said primary flow path and towards one or more internal surfaces of the duct to dislodge powder therefrom.

2. The apparatus of claim 1 wherein said device comprises a pulse valve.

3. The apparatus of claim 1 wherein said device is actuated while air flows through the duct to the separator.

4. The apparatus of claim 1 wherein said device comprises an accumulator coupled to said device for storing a supply of pressurized air.

5. In combination with a powder transfer duct that receives overspray powder from a powder spray booth: a control device for selectively releasing a pressurized blast of air into the duct to dislodge powder from an internal surface of the duct, wherein said control device directs said pressured blast of air at one or more interior surfaces of the duct where powder adheres under normal powder flow through the duct.

6. The combination of claim 5 wherein said control device comprises a pulse valve.

7. The combination of claim 6 wherein said control device comprises an accumulator that supplies a pressurized volume of air to said pulse valve.

8. The combination of claim 5 wherein said control device is mounted on a wall of the duct and includes a discharge port that opens to an interior volume of the duct generally transverse a primary air flow through the duct.

9. A method for cleaning a powder transfer duct that transfers overspray powder from a powder spray booth to a cyclone, comprising the steps of:

a) storing a volume of pressurized air; and b) using a quick pressure release device to selectively release said pressurized air volume into an interior volume of the duct to dislodge powder from an interior surface or region of the duct.

10. The method of claim 9 comprising the step of transferring powder through the duct using an air flow from the cyclone, wherein the step of releasing said pressurized air volume when said cyclone air flow is moving through the duct.

11. A powder spray system comprising:

a powder spray booth;

a cyclone separator;

a duct through which overspray powder can flow from said booth to said cyclone; and a device for directing a pressured blast of air substantially in the direction of an interior surface of the duct to dislodge powder adhering to said interior surface.

12. The system of claim 11 wherein said device comprises a pulse valve.

13. Th system of claim 12 wherein said valve is mounted on a wall of said duct.

14. The system of claim 12 wherein said device comprises an accumulator for supplying said pressured air volume to said valve.

15. The system of claim 11 comprising a blower for drawing air through said duct to said cyclone.

16. A method for quick color change in a powder spraying system of the type having a powder spray booth, a powder collection device and a duct that connects the spray booth to the collection device and conveyor powder overspray therethrough, the method comprising:

using a control device to selectively release and direct a pressurized air blast at an interior surface of the duct to dislodge powder adhering to said interior surface.

17. The method of claim 16 comprising the step of mounting the control device on a wall of said duct.

18. In combination with a powder transfer duct that receives overspray powder from a powder spray booth: a control device for selectively releasing a pressurized blast of air into the duct in a direction that is generally transverse a longitudinal axis of the duct to dislodge powder from an internal surface or region of the duct.

19. The combination of claim 18 wherein said control device comprises a pulse valve that releases from a pressurized air source a short blast of pressurized air into the duct.

* * * * *